United States Patent [19]
Sarma et al.

[11] Patent Number: 5,918,242
[45] Date of Patent: Jun. 29, 1999

[54] GENERAL-PURPOSE CUSTOMIZABLE MEMORY CONTROLLER

[75] Inventors: Sudha Sarma, Tucson, Ariz.; Adalberto Guillermo Yanes, Sunnyvale, Calif.

[73] Assignee: International Business Machines Corporation, Armonk, N.Y.

[21] Appl. No.: 08/805,095

[22] Filed: Feb. 24, 1997

Related U.S. Application Data

[63] Continuation of application No. 08/209,499, Mar. 14, 1994, abandoned.

[51] Int. Cl.[6] ........................................ G06F 12/00
[52] U.S. Cl. ................................... 711/5; 711/105
[58] Field of Search ........................ 711/5, 203, 206, 711/105

[56] References Cited

U.S. PATENT DOCUMENTS

| | | | |
|---|---|---|---|
| 4,796,221 | 1/1989 | Tokumitsu | 395/421.01 |
| 4,858,175 | 8/1989 | Sato | 395/800 |
| 4,890,238 | 12/1989 | Klein et al. | 364/491 |
| 4,931,946 | 6/1990 | Ravindra et al. | 364/490 |
| 5,155,819 | 10/1992 | Watkins et al. | 395/800 |
| 5,175,835 | 12/1992 | Beighe et al. | 395/421.02 |
| 5,239,639 | 8/1993 | Fischer et al. | 395/494 |
| 5,263,032 | 11/1993 | Porter et al. | 371/40.2 |
| 5,301,278 | 4/1994 | Bowater et al. | 395/405 |
| 5,394,541 | 2/1995 | Chesley et al. | 395/494 |
| 5,418,924 | 5/1995 | Dresser | 395/494 |
| 5,440,752 | 8/1995 | Lentz et al. | 395/800 |

OTHER PUBLICATIONS

"Programmable Memory Controller" Feb., 89, IBM Technical Disclosure Bulletin, (pp. 351–354).

*Primary Examiner*—Jack A. Lane
*Attorney, Agent, or Firm*—Robert M. Sullivan

[57] ABSTRACT

A memory controller design includes at least one memory instruction decoder de-embedded from a memory instruction processor wherein the memory instruction processor receives operations and logical address information from a host processor. The memory instruction processor converts the operations into generic memory instructions and translates the logical addresses into physical addresses. The memory instruction decoder further converts the generic memory instructions into memory specific control signals and converts the physical addresses into actual memory specific addresses. This design permits the memory instruction processor to be designed and finalized before an actual memory type is selected for system use at which time the less complex memory instruction decoder can be designed.

21 Claims, 7 Drawing Sheets

FIG. 3

| INSTRUCTION | OPERATION |
|---|---|
| ACTIVATE | ROW ACCESS (RAS) |
| READ | COLUMN ACCESS (CAS) |
| WRITE | COLUMN ACCESS WITH DATA (CAS, WE, DATA) |
| REFRESH | REFRESH |
| PRECHARGE | PRECHARGE |
| MODE REGISTER SET | SET WRAP LENGTH, CAS LENGTH, WRAP TYPE |
| MASK | DQM |

FIG. 4
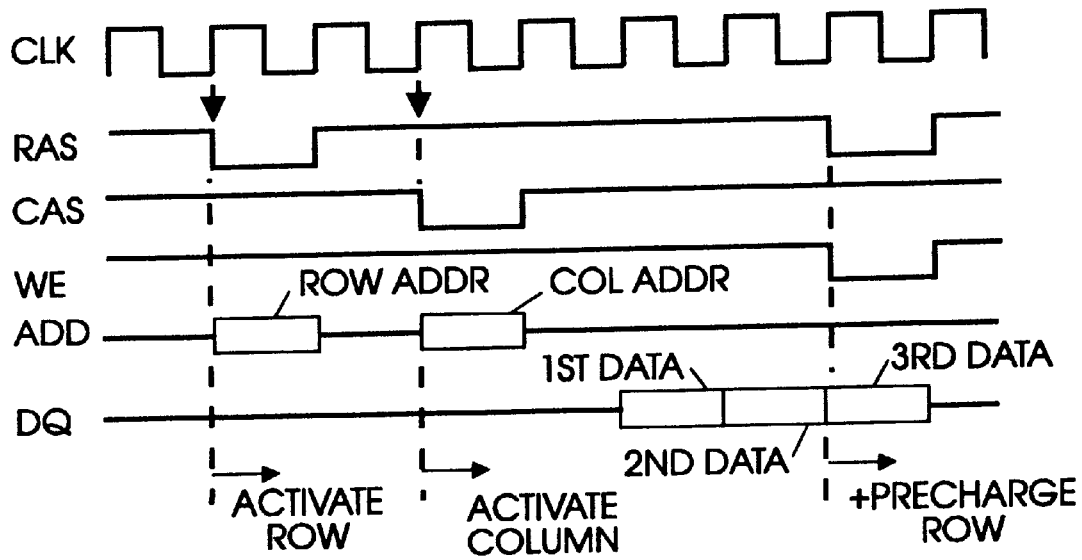
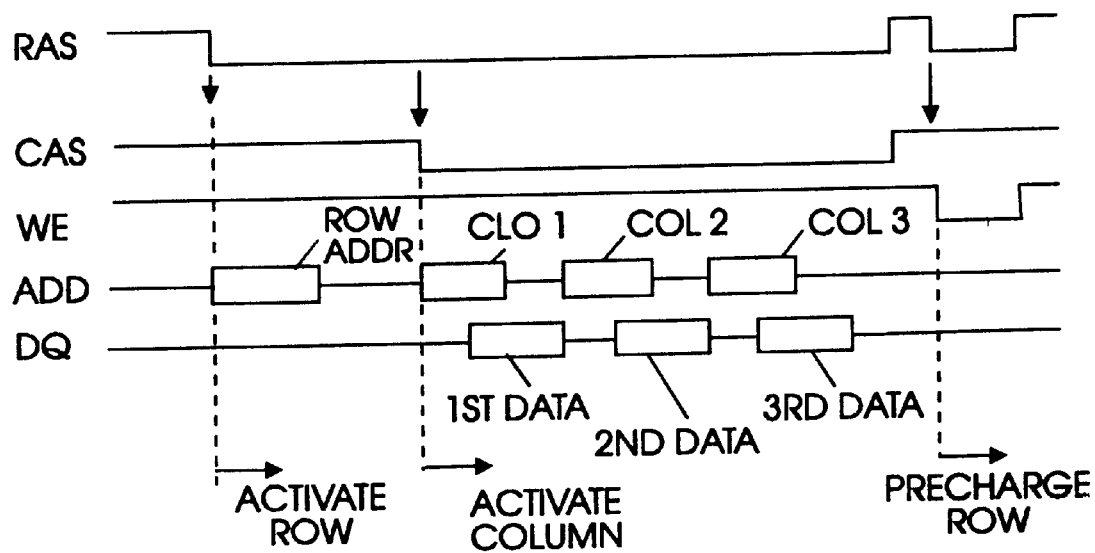

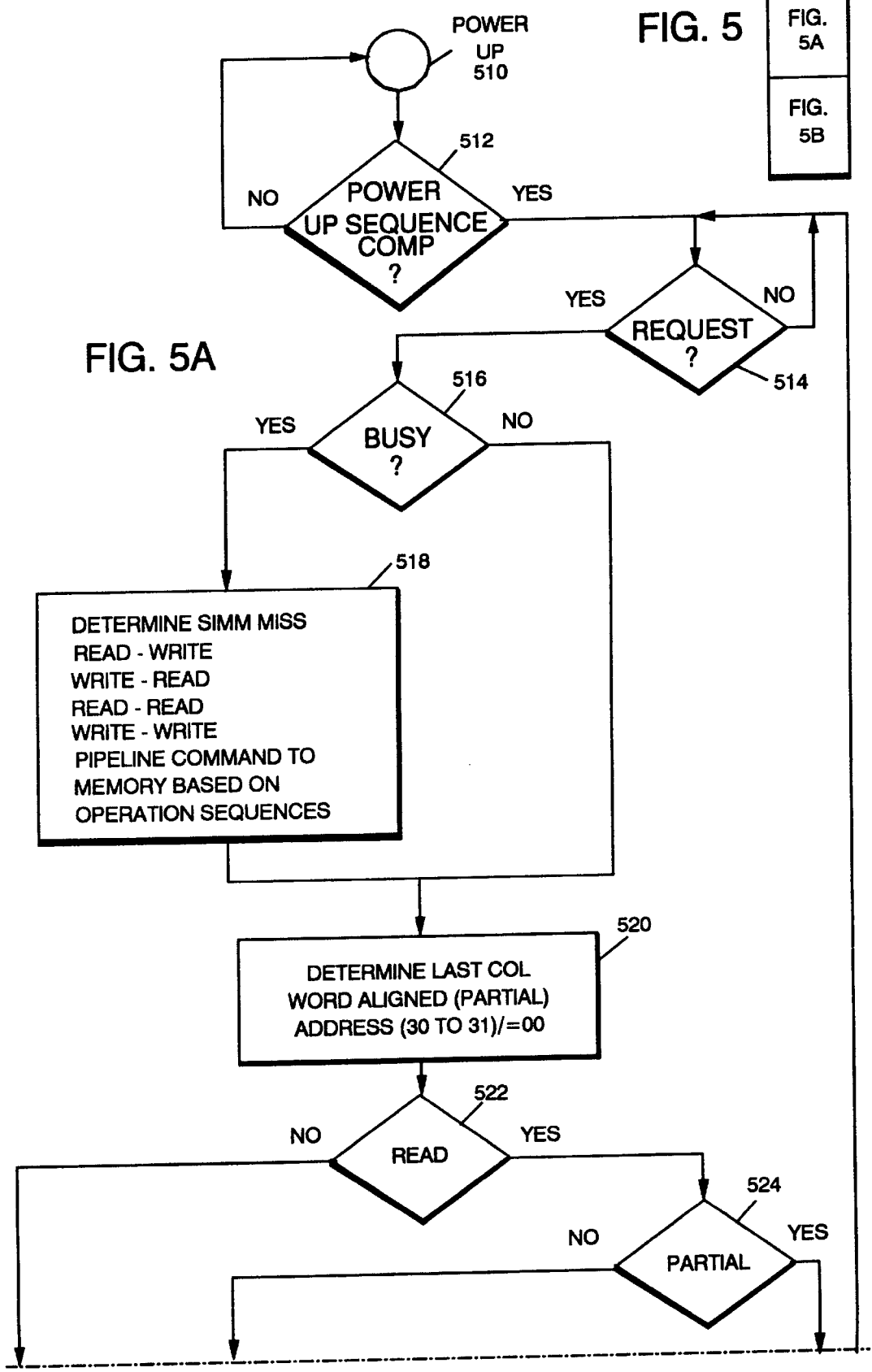

GENERAL-PURPOSE CUSTOMIZABLE MEMORY CONTROLLER

This is a continuation of U.S. application Ser. No. 08/209,499, filed Mar. 14, 1994, now abandoned.

FIELD OF THE INVENTION

The present invention relates generally to memory controllers, and more particularly, to a memory controller design and method providing an ability to access and control differing memory types.

BACKGROUND OF THE INVENTION

An ability to store large amounts of data (or records), which data can be efficiently accessed, modified, and restored, is generally a necessary function for large, intermediate and, in some instances, even small computing systems. Data storage is typically separated into several different levels, or hierarchically, in order to provide efficient and cost effective data storage. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nano-seconds. The electronic memory provides the fastest access to data since access is entirely electronic. The amount of electronic memory that can be realistically provided in a data processing system is limited due to the higher cost of such memory.

A second level of data storage usually involves direct access storage devices (DASD). DASD storage, for example, can comprise magnetic and/or optical disks, which store bits of data as micrometer sized magnetic or optical altered spots on a disk surface for representing the "ones" and "zeros" that make up those bits of the data. Magnetic DASD, includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store gigabytes of data with the access to such data typically measured in milli-seconds (orders of magnitudes slower than electronic memory). Access to data stored on DASD is slower due to the need to physically position the disk and HDA to the desired data storage location.

A third or lower level of data storage includes tape and/or tape and DASD libraries. At this storage level, access to data is much slower since a robot is now needed to select and load the needed data storage medium. The advantage is reduced cost for very large data storage capabilities, for example, tera-bytes of data storage. Access to data stored on tape and/or in a library is presently on the order seconds.

Generally, faster access to data is desirable, and hence different solutions have been presented to improve the access to data amongst the different hierarchical levels of data storage. One widely used method to improve access to data uses a specialized electronic memory, known as cache, to temporarily hold data and/or instructions being transferred from DASD to a host processor, for example. Increasing the size of cache memory provides improvements in data access rates to data stored in lower levels of the hierarchy. Cache sizes, once relatively small and measured in kilobytes, are now much larger being measured in megabytes or even giga-bytes of data storage. Such large caches exacerbates the need for an intermediary, for example, a memory controller, to interface the cache memory to the host processor. In such a system, a host processor may simply send a request to the memory controller, for example an address and an amount of data, and the memory controller translates the address, retrieves the data, and performs all other memory maintenance functions, including refresh. Thus the host processor is free to perform other processing tasks.

An example of a data processing system, may take the form of a host processor, such as an IBM System/360 or IBM System/370 processor for computing and manipulating data, attached to an IBM 3990 storage controller having a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

Referring to FIG. 1, a generalized block diagram of a memory controller is shown. The memory controller, as part of a storage controller, receives commands from a host processor to store or fetch data from cache memory. The object of interfacing the memory controller between the cache memory and the host processor is to improve the bandwidth of data transfer therebetween, that is, to move more data in the same time span. To implement the increased data bandwidth, the memory controller uses an arbitration or program manager to try to predict what steps will follow the request currently being executed. This is accomplished by looking ahead to the next operation from the host processor. Another common function of the memory controller is to perform data error checking and correcting for ensuring data integrity for data being stored in and retrieved from DASD. Still further the memory controller is necessary to synchronize communication between the host processor and the cache memory since electronic memory typically operates at a slower speed (for example, 25 Mhz) than the host processor (for example, 50 Mhz).

Cache memory may take several forms, including, for example, both volatile and non-volatile semiconductor memory. Volatile memory is that memory which loses its contents after power is removed, for example, DRAM or SRAM. Non-volatile memory is that memory which can retain its contents even after power is removed, for example, read only memory (ROM), electrically alterable random access memory (EARAM), or battery backed-up DRAM. DRAM is typically the least expensive of the electronic memories but suffers from the disadvantage of increased functional operating requirements. DRAM must be refreshed, that is, its memory contents is written back to itself on a regular basis in order to ensure its data contents is maintained. Such refresh interferes with regular data access and requires proper timing. SRAM is faster and less complex than DRAM but has an increased cost because fewer bits of data can be stored for a given area. Non-volatile memory may have lower or higher costs than volatile memory depending upon the density of bits and the number of processing steps required for manufacture.

Computer systems continue to increase in complexity as higher performance characteristics and greater storage capacities are pursued. Conversely, product lifetimes are decreasing. Hence, product development cycle times must decrease accordingly, even though more sophisticated and complex systems are being designed. The design of the memory controller is complex and time consuming and since the memory addressing and control commands are integral to the memory controller, the type of memory used in cache must be specified at the beginning of the design cycle.

Several drawbacks result from having to determine the memory type at the beginning of the design cycle. First, new memory types may become available after the design cycle begins. For example, synchronous dynamic random access memory (SDRAM) is a newly available memory type. Second, memory having similar storage capacities but differing addressing schemes may be desired after product announce. Third, customers needs may change after using the data processing system, for example, it may be desired to replace DRAM with SRAM or SDRAM as funds become available.

One attempt to alleviate the rigidity of being locked into a single memory type has been to provide an address generator capable of addressing different types of memory. The address generator, given a memory select signal, could address either DRAM or SRAM. Such a solution, however, still requires that the memory controller still be able to provide memory specific signals such as refresh, instruction decoding etc. Hence, accessing a new memory type such as SDRAM requires a entirely new memory controller.

Accordingly it is desired to provide a method and apparatus for providing the flexibility in memory controller design to allow multiple memory types to be used in cache memory or to allow the choice of cache memory type to be chosen late in the design cycle or to be changed after product development without requiring a new memory controller design.

SUMMARY OF THE INVENTION

An object of the present invention is to provide an improved memory controller design and method for using differing memory types in cache.

According to a first embodiment of the present invention, a design method for providing a flexible memory controller is provided, wherein the memory controller interfaces a host processor to a first memory for improving a data bandwidth therebetween, the memory controller receiving operations and logical addresses from the host processor and providing memory control signals and actual memory addresses to a first memory. The design method comprises the steps of: (a) designing a memory instruction processor, prior to identifying an architecture of the first memory, for receiving the operations and logical addresses and providing memory instructions and physical address therefrom; (b) designing a dataflow block for error checking and correcting (ECC) and sparing, the dataflow block coupled between the first memory and the host processor and being controlled by said memory instruction processor; (c) identifying a first memory type to be interfaced to the memory instruction processor; and (d) designing a first memory instruction decoder for accessing the first memory and decoding memory instructions from the memory instruction processor into control signals specific to the first memory and converting the physical addresses into actual addresses for the first memory.

In another embodiment of the present invention, a memory controller interfaces a cache memory to a host processor for increasing a data bandwidth therebetween. The cache memory has a first memory characterized by a first architecture type, wherein the memory controller receives operations and logical addresses from the host processor for accessing the cache memory. The memory controller comprises a memory instruction processor for receiving the operations and logical addresses for conversion to generic memory instructions and physical addresses, respectively. A dataflow block is coupled between the cache memory and the host processor for providing data control. Also a first memory instruction decoder, de-embedded from the memory instruction processor, translates the physical addresses into actual addresses of the first memory and converts the generic memory instructions into control signals specific to the first memory.

The foregoing and other objects, features, and advantages of the invention will be apparent from the following more particular description of a preferred embodiment of the invention, as illustrated in the accompanying drawing.

DESCRIPTION OF THE FIGURES

FIG. 3 is a table showing representative instructions and operations of the memory controller in accordance with a preferred embodiment of the present invention.

FIG. 4 is a timing diagram depicting representative address and control signals in accordance with a preferred embodiment of the present invention.

FIGS. 5A and 5B is a flow diagram showing a method of operation of the memory controller.

DETAILED DESCRIPTION

Figure 1:
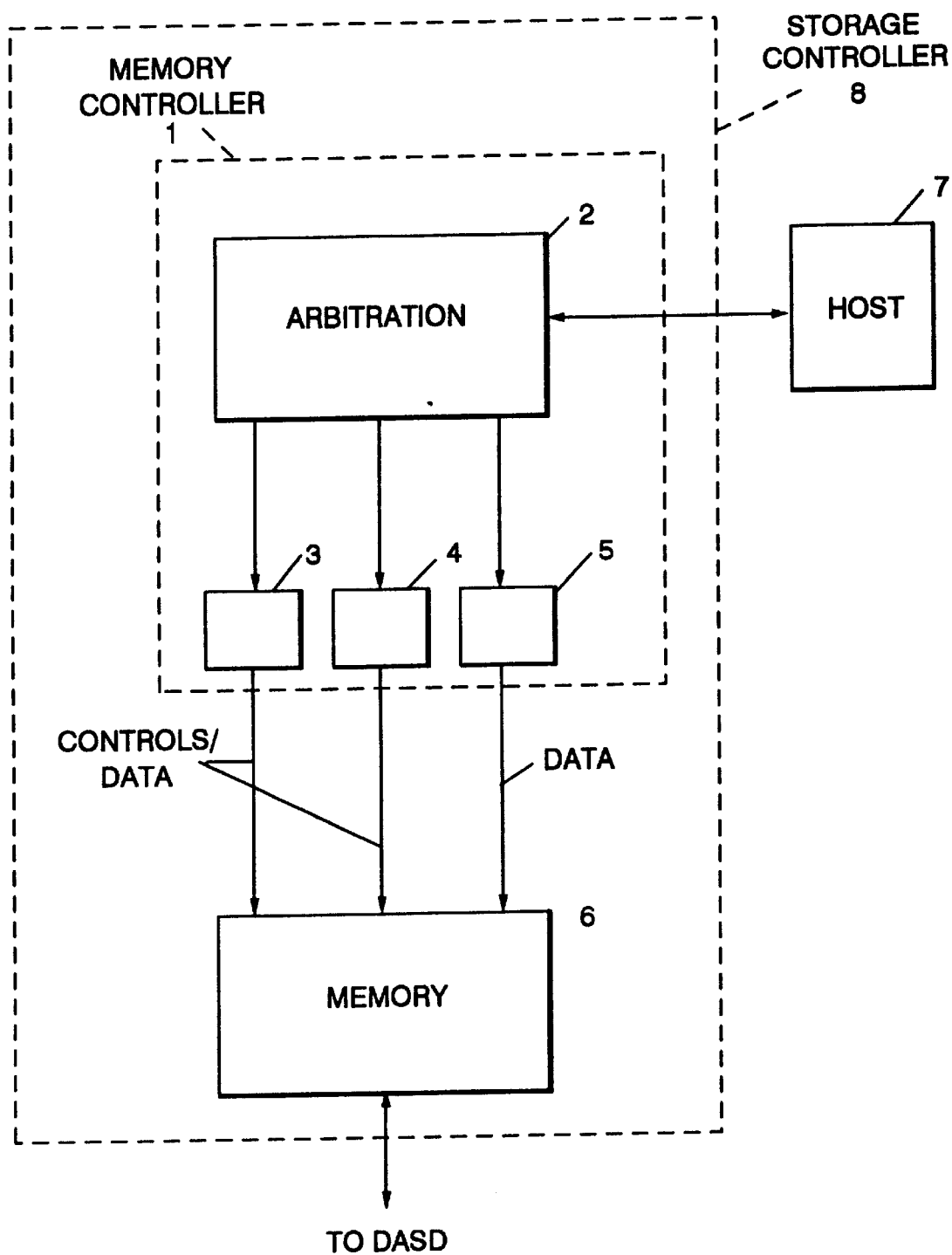
FIG. 1 is a block diagram of a prior art memory controller.

Referring now to FIG. 1, a prior art memory controller 1, as part of a storage controller 8, is shown interfaced to a host computer 7 for transferring instructions and data therebetween. An arbitration circuit 2 operates to optimize a data rate at the memory interface, and supplies the performance heuristics ensuring efficient memory use. The arbitration circuit 2, more specifically, performs address checking, address translations, instruction decoding, error checking and correcting, look ahead logic, etc., as is well known in the art. Data and logic blocks 3, 4, and 5 provide data buffering and control signals for cache memory 6.

Figure 2:
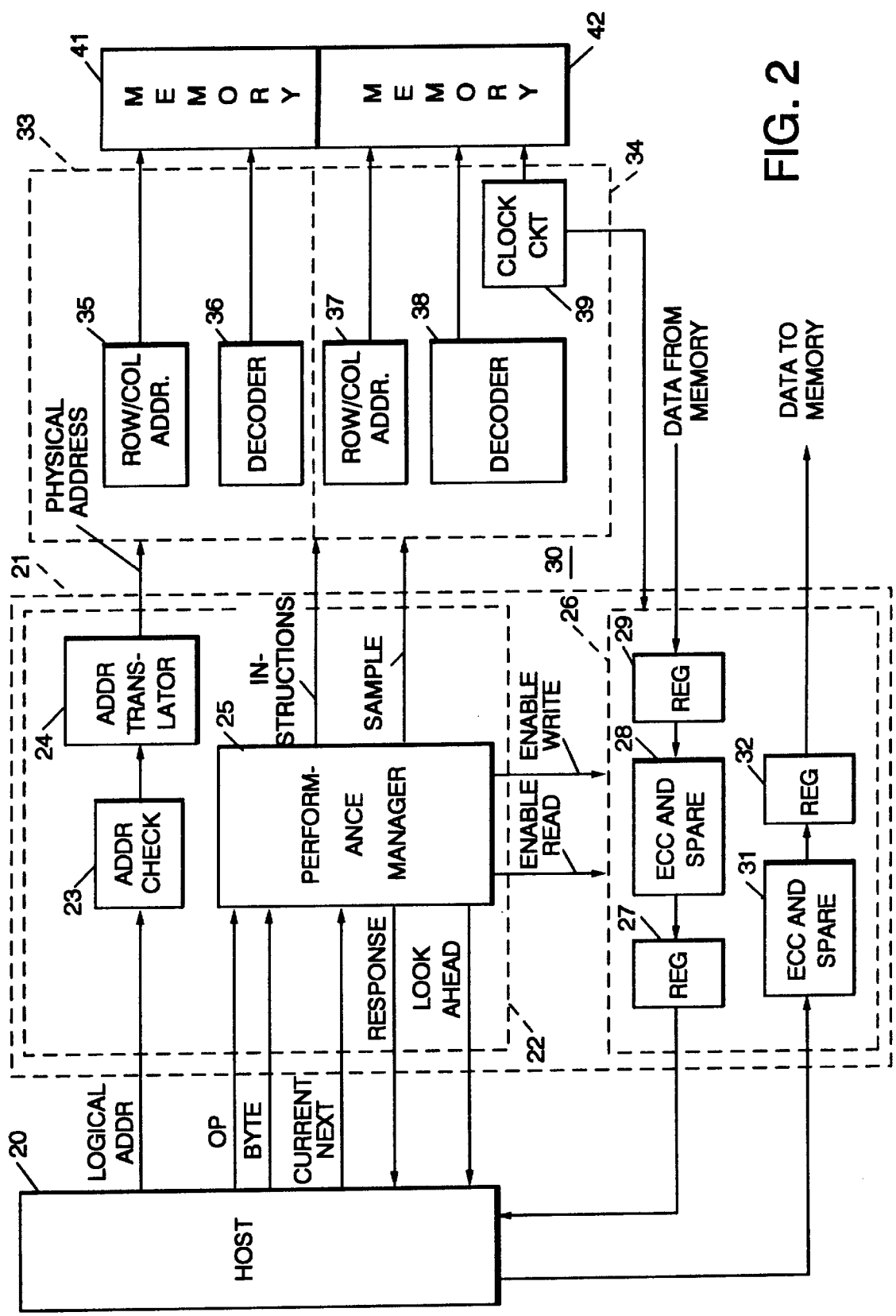
FIG. 2 is a block diagram of a memory controller in accordance with a preferred embodiment of the present invention.

FIG. 2 is a block diagram of a memory controller 30 according to a preferred embodiment of the present invention. The memory controller is made up of three sections including a memory instruction processor (MIP) 22, a memory instruction decoder (MID) 33, 34, and a dataflow block 26. The memory controller 30 is also logically and physically separated into two sections: the MIP 22 and dataflow block 26; and the MID 33, 34. According to the present invention, it has been determined that by de-embedding the memory instruction decoder 33 and/or 34 out of the rest of the memory instruction processor 22 and dataflow block 26, that the memory instruction decoder 33/34 can designed as a block for in fact customizing the memory controller 30 versus being embedded therein and thus making the entire memory controller 30 memory specific and hence inflexible. Referring back to FIG. 1, a memory instruction decoder does not exist as a separately identifiable unit, rather the memory instruction decoding functions are integral (embedded) to the memory controller 30.

The MIP 22 further includes an address checker 23 coupled for receiving logical addresses from a host processor 20. The address checker 23 verifies that the received logical address is within the range of a predetermined range of addresses. The address range, then, is a function of the amount of cache memory 41, 42 used in a system, for example, thirty-two megabytes to four gigabytes of memory. If a received logical address is out of range, the address checker 23 generates an appropriate error signal. If an acceptable logical address has been received, that address is forwarded to an address translator 24. The received logical address does not correspond to a physical address of the cache memory 41, 42. The physical address must thus be translated by the address translator 24 as is known in the art. Such an address translation may take into account, for example, that the memory 41, 42 may be divided into two or more banks of memory. As an example, a least significant bit of the physical address may be a logical "0" to address memory 41 while a logical "1" would address memory 42.

A performance manager 25 contains the complex logic required to optimize data movement between the host processor 20 and the memory 41, 42. State machines internal to the performance manager 25 ensure data integrity, and ensure proper precharge and refresh to the memory 41, 42. Performance manager 25 receives the actual operations (OP) or commands from the host processor 20 to be performed by the memory controller 30. When data is written to and received from memory 41, 42, typically many bytes of data are staged in a single operation. A BYTE command from the host processor 20 informs the performance manager 25 as to how many bytes of data are to be moved. Hence, given a logical address and number of bytes, the performance manager 25 can take over processing from the host processor 20. The performance manager 25 also receives a next instruction from the host processor 20 so that the performance manager 25 can improve memory bandwidth. For example, the performance manager can currently cause a precharge to occur if it is known that a read data command is to occur next.

As greater memory capacities are designed into a system, the gap between processor performance and memory access is widened even further. Memory performance has been unable to keep pace with processor performance to close the already existing gap. The memory controller 30, accordingly, is depended upon to narrow the performance gap.

In past memory controller designs if a received logical address translated into memory physical address, for example, of Row two, Col three, and requiring ninety bytes of data, then the performance manager starts addressing at Row two, Col zero and continues forward until at least ninety-four bytes of data are retrieved. The host processor would then ignore the first three data bytes. Although this approach was slightly inefficient from a memory access standpoint, it reduced the amount of logic necessary to cause the memory access to occur. In the current design, the performance manager 25 will start the memory access at Row two, Col three, hence handling the bytes according to the exact BYTE count so as to improve the performance of the memory access and hence reduce the processor/memory performance gap.

As is known in memory design, soft errors sometimes occur causing random bit errors in data stored in semiconductor memory. The dataflow block 26 improves data integrity by error checking and correcting (ECC) data written to and read from the memories 41, 42. ECC and spare circuit 31 receives data to be written to the memory 41, 42 from the host processor 20 which data is clocked through registers 32 for proper timing to be stored in the memory 41, 42. The ECC circuit 31 basically appends several additional bits to each data word (a data word may be for example 4 bytes) for error checking and correcting when that same data is later retrieved from memory 41, 42. Data retrieved from the memory 41, 42 is clocked through registers 29 into an ECC and spare circuit 28 before being clocked through registers 27 and on to the host processor 20. Depending upon the number of ECC bits used, a number of bit errors can be detected and corrected per each word. The ECC and spare circuit 28, for example, may detect two-bit errors and properly correct single bit errors. Data reading and writing in the data flow block 26 is controlled via the performance manager 25 through the ENABLE READ and ENABLE WRITE control signals.

In the event that more than a predetermined number of bit errors occur, or a predetermined pattern of bit errors (certain row, column errors) occur, then it is likely that a particular memory or portion of a memory is causing hard errors versus soft errors. The dataflow block 26, upon recognizing such errors will cause a spare memory array to be permanently used in place of the suspected errant memory array.

Memory controller design is complex wherein the complexity lies mainly within the memory instruction processor 22. A substantial improvement in the system design cycle is achievable by reusing the memory instruction processor 22 and/or dataflow block 26. This has not been the practice in the past as the type and generally the amount of cache to be used in a system is defined at the inception of product design. The most efficient memory controller design involved embedding the memory instruction decoder functions within the memory controller along data flow and logic lines. The memory instruction processor 22 can, however, be designed as a stand alone block to be interfaced to a memory instruction decoder at a later time in the design cycle. The memory instruction decoder is less complex in design relative to the memory instruction processor 22. Thus, the memory instruction processor 22 can be fully designed without even identifying specifically memory to be used in the system. As the product design nears the end of the cycle, memory type(s) can be identified and the memory controller 30 can be customized accordingly by designing only the memory instruction decoder logic. This allows the memory instruction processor 22 to be timely designed, to be re-used in subsequent designs, and allows the newest memory technologies to be selected at a later time.

The memory instruction processor 22 can be designed in gate array technology, standard cell technology, or as a custom circuit. The memory instruction decoder 33, 34, may be designed using like technologies. A design methodology, could comprise, for example, designing the memory instruction processor 22 to exist as a large standard cell that can be re-used and the memory instruction decoder 33, 34 can be later designed as a standard cell and integrated with the memory instruction processor 22. In the alternative, any combination of the technologies are useable to meet specific design requirements, including design time, cost, performance, and quantities.

The memory instruction decoder 33, in its simplest sense, receives address and instructions from the memory instruction processor 22 and converts/decodes those signals to the specific signals required according to a specific memory architecture chosen. A row/column address circuit 35, for example, converts a received physical memory address from the memory instruction processor 22 into actual row address select (RAS) and column address select (CAS) addresses (this assumes that the memory 41 is a dynamic memory). As is well known in DRAM memory design, due at least in part to the pin driven packaging of dynamic memory design, row addresses and column addresses are multiplexed over the same address pins. Hence, the row addresses are applied first (after precharging the row) and latched, then the same address pins are then allowed to receive the column addresses. The specific row and column address varies with the architecture (row/column design) of the memory. A decoder 36 (38) decodes the instructions and sends a corresponding control signals to the memory 41 (42).

FIG. 3 provides an instruction decoding example wherein an ACTIVATE instruction generated in the memory instruction processor 22 causes a RAS with the corresponding row address and a following READ instruction causes a CAS with a corresponding column address thus data is read from the memory 41. A REFRESH instruction is instigated by the memory instruction processor 22 independent of the host processor 20. Referring back to FIG. 2, a second memory instruction decoder 34 is shown coupled to the memory instruction processor 22 and the dataflow block 26. The memory instruction decoder 34 additionally contains a clock circuit 39 for providing clock signals to the memory 42 and the dataflow block 26. The memory 42, for example, is an SDRAM requiring differing specific control signals though those specific control signals are derived from the same set of instructions provided by the memory instruction processor 22 as are provided to the memory instruction decoder 33.

The SDRAM 42 allows received control signals to be sampled on clock edges. Data, likewise, is synchronously outputed from the memory 42 on clock edges (see FIG. 4). Referring again to FIG. 3, Mode Register Set and MASK instructions apply only to the SDRAM 42 which has different operating requirements than the DRAM 41. The memory controller 30, as shown in FIG. 2, not only allows for technology re-use, and memory selection deferral, but further provides a mechanism wherein two functionally different memories may be used in cache and interfaced to a host processor by the same memory instruction processor.

Figure 5B:
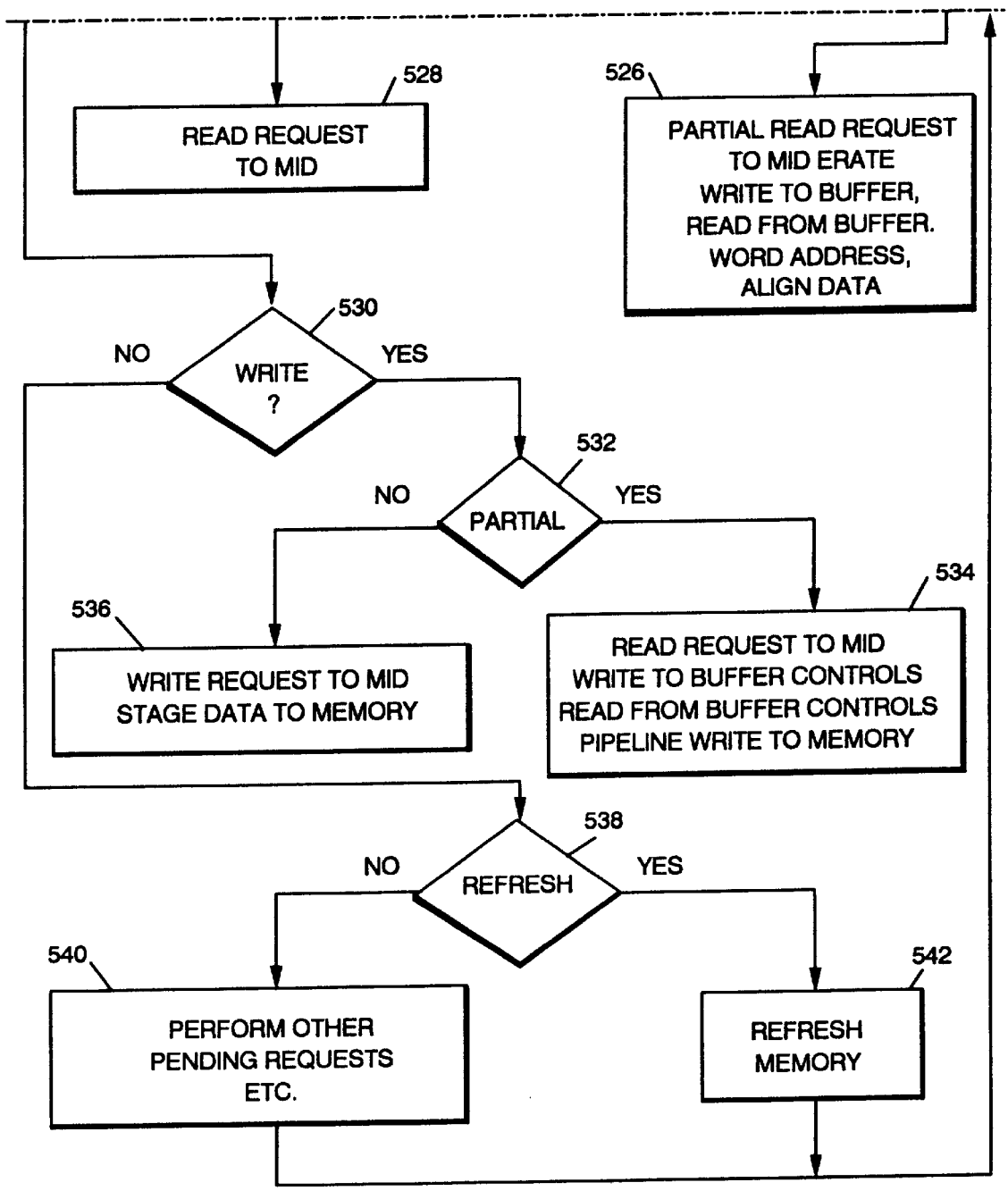

FIGS. 5A and 5B provides a flow diagram of the operation of the memory controller 30 (FIG. 2). An initial step, 510, begins a power-up sequence whereby the memories 41, 42 are configured, registers are set, etc. At step 512, a test is performed to determine whether the power-up sequence has successfully completed. If the power-up sequence is not finished the method causes control to loop back to step 510 until completed. When power-up sequence is complete, decision step 514 determines whether a request from the host processor has been received at the memory controller 30. If a request is not pending, step 514 loops back to itself, or waits, until such a request is received.

When a request is received at the memory controller 30 step 516 determines whether the memory controller 30 is presently servicing a prior request or whether the memory controller 30 is idle. An idle memory controller 30 causes control to switch to step 520 for responding to the pending request. If the memory controller 30 is already busy servicing a current request, then control goes to step 518 for improving memory bandwidth by looking ahead, that is, by determining from the current operations of the memory controller whether certain commands can be pipelined to the memory based upon known executing commands. For example, step 518 considers whether the pending request results in a cache row hit or a cache miss. In the event that a current command is a read and a pending request is a read, it is possible that a current row is the same row accessed in the pending read, hence a cache row hit occurs, and it will not be necessary to precharge the row, but only to address the appropriate columns. Additional cache row hits are tested when going from a write request to a read request, from a read request to a write request, or from a write request to a write request.

When the memory controller 30 accesses more than a single memory type, and hence at least two memory instruction decoders are used, then step 516 determines though one memory is busy, the other memory may be idle. The idle memory, depending upon the memory interface, may be accessed thus allowing overlapping memory accesses in some situations.

Step 520 checks a last column that was accessed and if the last column of a memory array is reached, and more data still needs to be accessed for a given row, causes access to flip to a next memory bank, same row and next column. More than one type of memory can exist in the cache to be accessed by a single memory controller. DRAM and non-volatile memory, in an actuality can be the equivalent DRAMs wherein that DRAM having battery back-up is the non-volatile memory such that should power fail, that battery backed-up DRAM will retain its contents. This distinction is important since past memory controllers can access both DRAM and non-volatile memory since their commands are equivalent. The method according to the present invention, however, can access two fundamentally different memory types in cache with a single memory controller. Referring back to FIG. 2, assume that memory 41 is DRAM and that memory 42 is SDRAM. Memories 41 and 42 are not only functionally different, but memory 42 requires commands and clocks not recognized by memory 41. The memory instruction processor 22, however, received requests from the host processor, including logical addresses, that can be processed generically to a certain point regardless of the memory architecture. The memory instruction decoders 33 and 34 receive the instructions from the memory instruction processor 22 and decode only those instructions that apply to the particular memory being accessed and hence controlled by its instruction decoder. For example, if access to the memory 41 is required, based upon the physical address, memory instruction decoder 33 will recognize the instruction as one for memory 41 and will decode the instructions accordingly. Conversely, if a physical address received indicates that memory 42 is to be accessed, then memory instruction decoder 34 will recognize that it is to decode the instruction and apply the appropriate control signals to the memory 42.

Step 522 determines whether the pending request is a READ, and if not, passes control to step 530. In the event of a READ request, step 522 steers the request to step 524 for determining whether the READ request is a partial read or a full read. A partial read involves a request that only requires part of a word, for example one byte of a four byte word to be read. If a partial read is requested, then control goes to step 526 to perform the partial read, else control goes to step 528 to perform a full read request.

In step 528, the READ instruction from the memory instruction processor is sent to the memory instruction decoders, along with the address, and the appropriate memory instruction decoder decodes the READ instruction for the respective memory. For a partial read, the instruction is similarly sent to the memory instruction decoders, but the partial word is sent to a buffer before being sent back to the host processor.

Step 530 determines if the pending request is a WRITE request (the request is known to not be a READ request). A request other than a WRITE request results in control going to step 538. A WRITE request causes step 532 to determine whether the WRITE request is a partial or full write. A PARTIAL WRITE request is handled at step 534, wherein similar to a PARTIAL READ request, only a portion of a word is written to memory. In order to avoid corrupting a portion of the word that is not being written, that portion is written to a buffer (a read request is applied via the memory instruction decoder) so that the unchanged portion can be appended to the partial word to be written to the memory. If the WRITE request was not a PARTIAL WRITE, but a normal WRITE, then step 536 causes a WRITE request to be executed via the appropriate memory instruction decoder.

If the request to memory was other than a READ or WRITE request, then control is directed to step 538 where another request is performed, for example, a REFRESH request may be serviced. Step 542 would then cause the memory to be refreshed (refresh being generated in the MIP 22). At step 540 another type pending request would be serviced accordingly. Control is then returned to step 514 to determine whether another request is pending and the cycle repeats.

Figure 6:
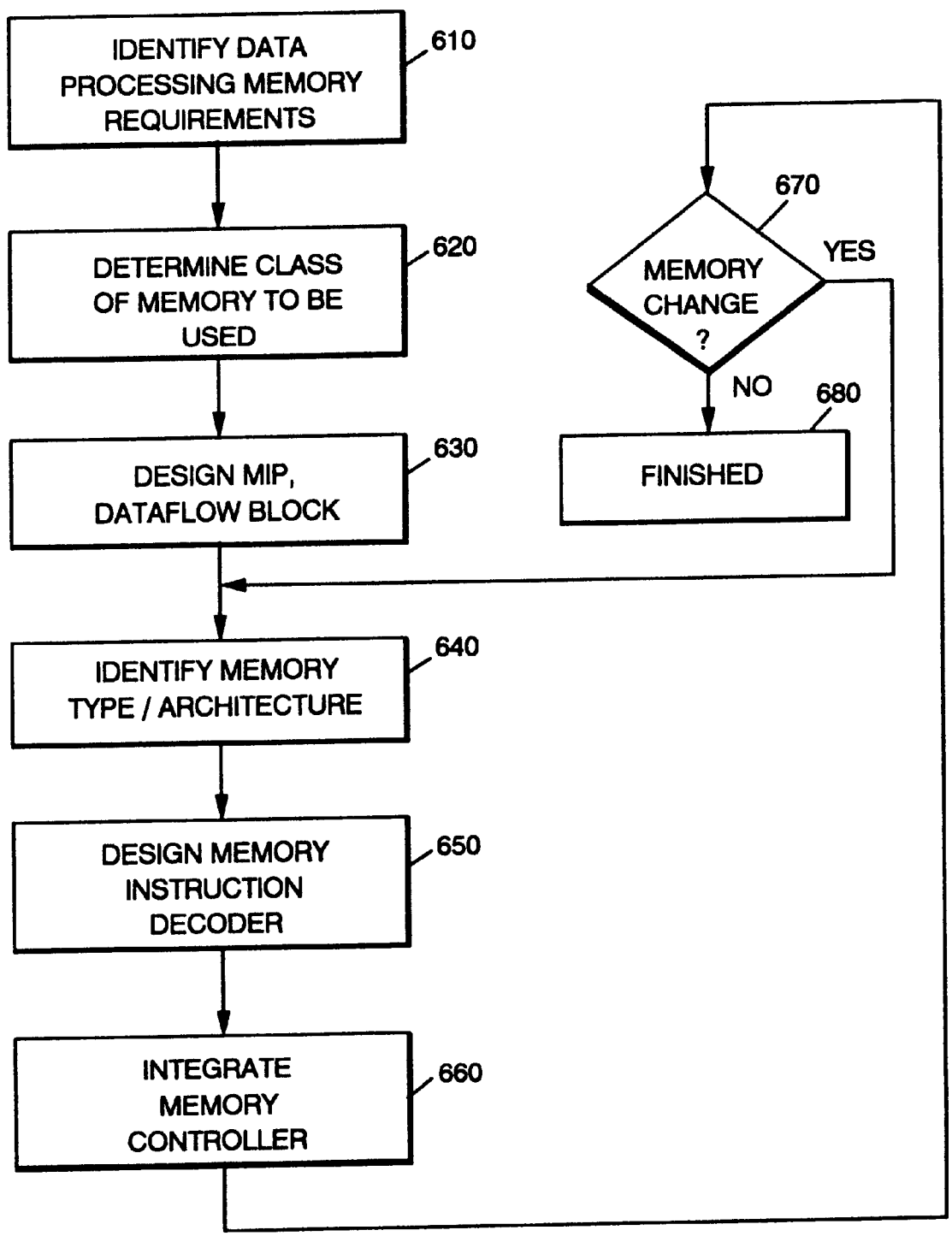
FIG. 6 is a flow diagram describing a design methodology in accordance with a preferred embodiment of the present invention.

FIG. 6 diagrams a design methodology that allows the choice of actual cache memory to be deferred until a much later time in the memory controller design cycle, thus enabling the selection of the latest available memories. At step 610 memory requirements for the data processing system are accessed such that operations and address ranges to be handled by the memory instruction processor are defined. Step 620 includes defining the class of memory to be used, that is, whether dynamic, static, non-volatile memory, etc., will be used so that the memory instruction processor output requirements can be defined. The memory instruction processor and the dataflow block can now be designed though the specific memory and memory architecture to be used is not yet known or finalized. Later in the design cycle, having provided a workable memory instruction processor, the particular type of memory (DRAM, SDRAM, etc.) and the specific architecture (row and column combinations) is identified at step 640. The memory instruction decoder(s), being far less complex than the memory instruction processor, can now be designed at step 650 relatively quickly with little design risk.

The memory instruction processor, dataflow block, and memory instruction decoders are integrated at step 660. The integration can be the combining of the different blocks into a standard cell integrated circuit, gate array integrated circuit, or even finalizing a custom design. Alternatively, the memory instruction decoder and dataflow block can be a finished working integrated circuit to which the memory instruction decoder(s), as a separate circuit is interfaced. Having made no changes to the selected memory at step 670, the memory controller design is complete at step 680. Should another memory be chosen at this stage of the design cycle, or should the existing memory in a completed data processing system be changed, then steps 640 through 660 are repeated for providing a new memory controller.

In summary, a data processing system having a customizable memory controller for interfacing a cache memory to a host processor for increasing a data bandwidth therebetween has been described. The cache memory includes a dynamic random access memory (DRAM) and a synchronous dynamic random access memory (SDRAM), wherein the memory controller receives operations and logical addresses from the host processor for accessing the cache memory. The memory controller comprises a memory instruction processor for receiving the operations and logical addresses for conversion to generic memory instructions and physical addresses, respectively, the memory instruction processor identifying row hits for improving cache memory access speed. A dataflow block is coupled between the cache memory and the host processor for providing data control, error checking and correcting, and sparing, the dataflow block clocking data received from and sent to the SDRAM. A first memory instruction decoder, de-embedded from the memory instruction processor, translates the physical addresses into actual addresses of the DRAM and converts the generic memory instructions into control signals specific to the DRAM, when applicable. Also, a second memory instruction decoder, de-embedded from said memory instruction processor, receives the generic memory instructions and physical addresses for translating the physical addresses into actual addresses of the SDRAM and converts the generic memory instructions into control signals specific to the SDRAM.

While the invention has been particularly shown and described with reference to preferred embodiments thereof, it will be understood by those skilled in the art that various changes in form and details may be made therein without departing from the spirit and scope of the invention. For example, new memory types can be used in future embodiments of the invention without departing from the teachings herein.

What is claimed is:

1. A design method for providing a flexible memory controller wherein the memory controller interfaces a host processor to a cache memory for improving a data bandwidth therebetween, the cache memory having a first and a second memory, the memory controller receiving operations and logical addresses from the host processor and providing memory control signals and physical addresses to the cache memory, the design method comprising steps of:

(a) designing a memory instruction processor, prior to identifying a memory technology for the first and the second memory, for receiving the operations and the logical addresses, translating the operations into generic memory instructions, and converting the logical addresses into memory system addresses;

(b) designing a dataflow block for error checking and correcting (ECC) and sparing, the dataflow block coupled between the cache memory and the host processor and being controlled by said memory instruction processor;

(c) identifying a first memory technology for the first memory;

(d) designing a first memory instruction decoder coupled between said memory instruction processor and said first memory for accessing said first memory and decoding the generic memory instructions into control signals specific to said first memory technology and converting the memory system addresses into physical addresses specific to said first memory;

(e) identifying a second memory technology for the second memory, said second memory technology different from said first memory technology; and (f) designing a second memory instruction decoder coupled between said memory instruction processor and said second memory for accessing said second memory and decoding the generic memory instructions into control signals specific to said second memory technology and converting the memory system addresses into physical addresses specific to said second memory.

2. The design method according to claim 1 wherein the step (a) includes designing a performance manager, the performance manager converting the operations from the host processor into the generic memory instructions, the instructions not being specific to a particular memory technology.

3. The design method according to claim 1 wherein step (a) includes designing an address checker wherein the address checker ensures that the logical addresses are within a predetermined range.

4. The design method according to claim 1 wherein the step (a) includes designing an address translator, said address translator converting the logical addresses into memory addresses.

5. The design method according to claim 1, wherein the step (d) includes designing a row/column address translator for providing row and column address signals to the first memory.

6. The design method according to claim 1 wherein the step (f) includes designing a row/column address translator for providing row and column address signals to the second memory.

7. The design method according to claim 6 further comprising a step (g) of integrating the memory instruction processor, the dataflow block, and the first memory instruction decoder onto a single semiconductor integrated circuit.

8. The design method according to claim 1 wherein the first memory technology is a dynamic random access memory (DRAM) technology.

9. The design method according to claim 1 wherein the second memory technology is a synchronous dynamic random access memory (SDRAM) technology.

10. A memory controller for interfacing a cache memory to a host processor for increasing a data bandwidth therebetween, the cache memory having a first and second memory type, the first memory type characterized by a first memory technology and the second memory type characterized by a second memory technology different from the first memory technology, said memory controller receiving host commands and logical addresses from said host processor for accessing the cache memory, said memory controller comprising:
  a memory instruction processor for receiving the host commands and logical addresses, said memory instruction processor converting said host commands into generic memory instructions and said logical addresses into memory system addresses, said memory system addresses corresponding to one of said memory types;
  a dataflow block coupled between the cache memory and the host processor for providing data control, error checking and correcting, and sparing;
  a first memory instruction decoder, de-embedded from said memory instruction processor, said first memory instruction decoder translating the memory system addresses into physical addresses of said first memory type and converting the generic memory instructions into control signals specific to the first memory technology; and
  a second memory instruction decoder, de-embedded from said memory instruction processor, said second memory instruction decoder translating the memory system addresses into physical addresses of said second memory type and converting the generic memory instructions into control signals specific to the second memory technology.

11. The memory controller according to claim 10 wherein the first memory type is a dynamic random access memory (DRAM), and the first memory technology is a DRAM technology.

12. The memory controller according to claim 10 wherein the second memory type is a synchronous dynamic random access memory (SDRAM), and the second memory technology is a SDRAM technology.

13. The memory controller of claim 10 wherein said memory instruction processor looks ahead for a cache row hit to avoid unnecessary row precharging.

14. The memory controller of claim 10 wherein said memory instruction processor receives a data request command from said host processor, instructs said first memory instruction decoder to access only said physical addresses in said first memory type storing a portion of the requested data, and instructs said second memory instruction decoder to access only said physical addresses in said second memory type storing a remaining portion of the requested data.

15. A data processing system having a customizable memory controller, said data processing system comprising:
  a host processor;
  a cache memory including a first memory type comprising a first memory technology and a second memory type comprising a second memory technology; and
  said memory controller for interfacing the cache memory to a host processor for increasing a data bandwidth therebetween, said memory controller receiving host operations and logical addresses from said host processor for accessing said cache memory, said memory controller comprising:
    a memory instruction processor for converting said host operations to generic memory instructions and said logical addresses to memory system addresses, said memory system addresses corresponding to one of said memory types, said memory instruction processor identifying row hits for improving cache memory access speed;
    a dataflow block coupled between the cache memory and the host processor for providing data control, error checking and correcting, and sparing, said dataflow block clocking data transferred between the host processor and the cache memory;
    a first memory instruction decoder, de-embedded from said memory instruction processor, said first memory instruction decoder translating said memory system addresses into physical addresses of said first memory type and converting the generic memory instructions into control signals specific to said first memory technology; and
    a second memory instruction decoder, de-embedded from said memory instruction processor, said second memory instruction decoder translating said memory system addresses into physical addresses of said second memory type and converting the generic memory instructions into control signals specific to said second memory technology.

16. The data processing system of claim 15 wherein said first memory type is a dynamic random access memory (DRAM), and said first memory technology is a DRAM technology.

17. The data processing system of claim 15 wherein said second memory type is a synchronous dynamic random access memory (SDRAM), and said second memory technology is a SDRAM technology.

18. A method, in a cache memory controller, for interfacing a cache memory to a host processor such that data bandwidth is increased therebetween, said cache memory having a first and second memory type, said first memory type characterized by a first memory technology and said second memory type characterized by a second memory technology different from the first memory technology, said cache memory controller coupled between said host processor and said cache memory, said method comprising steps of:

(a) receiving host commands and logical addresses from said host processor in a memory instruction processor;

(b) said memory instruction processor converting said host commands into generic memory instructions and said logical addresses into memory system addresses, said memory system addresses corresponding to one of said memory types;

(c) translating said memory system addresses into physical addresses of said first memory type using a first memory instruction decoder, said first memory instruction decoder de-embedded from said memory instruction processor, said first memory instruction decoder also converting said generic memory instructions into control signals specific to said first memory technology; and (d) translating said memory system addresses into physical addresses of said second memory type using a second memory instruction decoder, said second memory instruction decoder de-embedded from said memory instruction processor, said second memory instruction decoder also converting said generic memory instructions into control signals specific to said second memory technology.

19. The method of claim 18 wherein the first memory type is a dynamic random access memory (DRAM), and the first memory technology is a DRAM technology.

20. The method of claim 18 wherein the second memory type is a synchronous dynamic random access memory (SDRAM), and the second memory technology is a SDRAM technology.

21. The method of claim 18 further comprising step of:

(e) providing data control, error checking and correcting, and sparing using a dataflow block.

* * * * *